Dec. 5, 1961   N. A. MacLEOD   3,011,775
COIL SPRING COUPLING AND ARTICLES
MADE FROM COIL SPRINGS
Filed March 31, 1958   3 Sheets-Sheet 1

NORMAN A. MAC LEOD,
INVENTOR.
HERZIG & JESSUP,
BY          ATTORNEYS.
Warren T. Jessup

NORMAN A. MAC LEOD,
INVENTOR.

HERZIG & JESSUP,
BY ATTORNEYS.

Dec. 5, 1961  N. A. MacLEOD  3,011,775
COIL SPRING COUPLING AND ARTICLES
MADE FROM COIL SPRINGS
Filed March 31, 1958  3 Sheets-Sheet 3
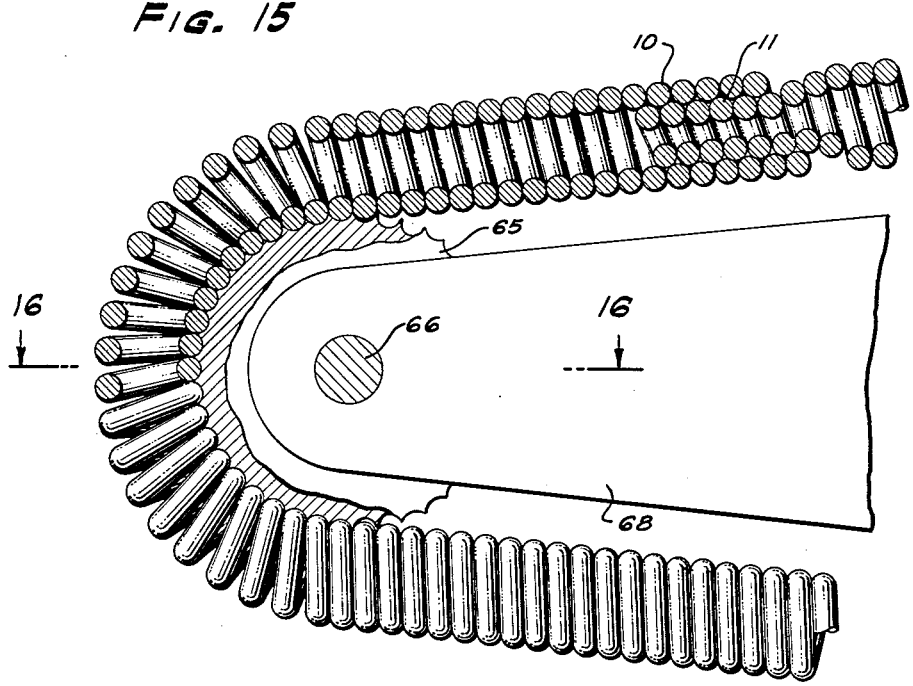
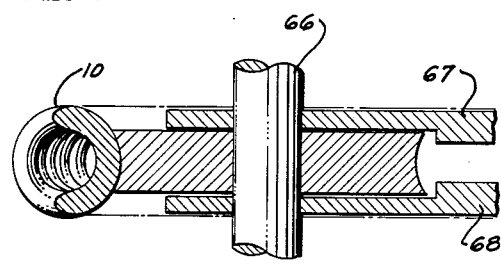
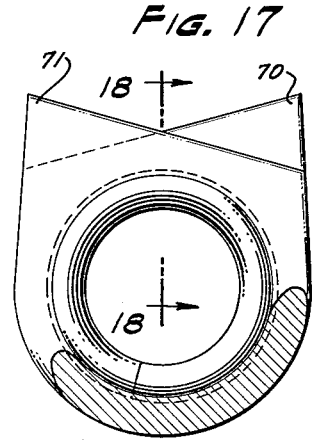
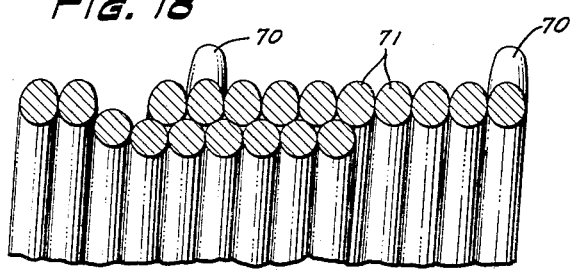
NORMAN A. MAC LEOD,
*INVENTOR.*
HERZIG & JESSUP,
BY  ATTORNEYS.
*Warren T. Jessup*

United States Patent Office 3,011,775
Patented Dec. 5, 1961

3,011,775
COIL SPRING COUPLING AND ARTICLES
MADE FROM COIL SPRINGS
Norman A. MacLeod, 1330 N. Fullerton Road,
La Habra, Calif.
Filed Mar. 31, 1958, Ser. No. 725,340
10 Claims. (Cl. 267—1)

This invention relates to the art of articles made from coil springs and the coupling together of the ends of coil springs. The invention relates particularly to the concept of coil springs the convolutions of which are not circular in cross-section and the coupling together of springs wherein the cross-section of convolutions is not circular.

By providing coil springs the convolutions of which have various shapes of cross-section other than circular, a variety of useful articles can be achieved and the security of the coupling between the ends of the springs is considerably improved.

It is known to the prior art to provide a coil spring and to form it into a circular flexible belt, for example, by providing convolutions of slightly smaller diameter at one end of the spring and threading this end into the other end of the spring to provide a coupling. The concept of the herein invention is that of utilizing and providing coil springs having various cross-sectional shapes; that is, the coil springs are formed from helically wound elements which may have different cross-sectional shapes. The cross-sectional shapes of the invention may be shapes wherein all sides of the cross-section are flat; that is, bounded by a straight line, or the sides may be partly straight lines and partly curves. These configurations of the helical elements provide for a number of advantages, as will be pointed out hereinafter, and make it possible that the coil spring itself becomes a useful tool of various different types. Depending upon the cross-sectional shape of the helical element, the spring may become or be used as a saw or a file or a flexible drive belt or chain having characteristics not present in prior known devices. In one form of the invention the coil spring provides a flexible belt of limited stretch or extensibility but having very great, that is, unusual, axial strength. In another form of the invention the coil spring with a similar spring threaded into it forms a tube or pipe which is not stretchable or extensible, but which is flexible.

In accordance with the foregoing, the primary object of the invention is to provide a new article of manufacture in the form of a coil spring formed of an element having a non-circular cross-section.

Another object of the invention is to provide improved coil springs formed of a number of non-circular cross-sections adapted to be coupled into a complete circle with improved security of the coupling by reason of the particular cross-section of the spring element.

Another object of the invention is to provide an improved coil spring formed of a member which may have various cross-sections other than circular adapting the article for use as a saw, file, rasp or the like, having characteristics not available in prior known devices.

Another object of the invention is to provide novel articles of manufacture formed of an improved coil spring formed of a member having a cross-section other than circular whereby the new articles have utility and characteristics not heretofore available in the prior art.

Further objects and numerous advantages of the invention will become apparent from the following detailed description and annexed drawings wherein:

FIGURE 15 is a partial sectional view of a coil spring flexible belt engaging with a toothed drive wheel;

FIGURE 16 is a sectional view taken along the line 16—16 of FIGURE 15;

FIGURE 17 is a view of another form of the invention wherein the convolutions of a coil spring are deformed so that the convolutions themselves are of non-circular shape; and FIGURE 18 is a detail view taken along line 18—18 of FIGURE 17.

Figure 1:
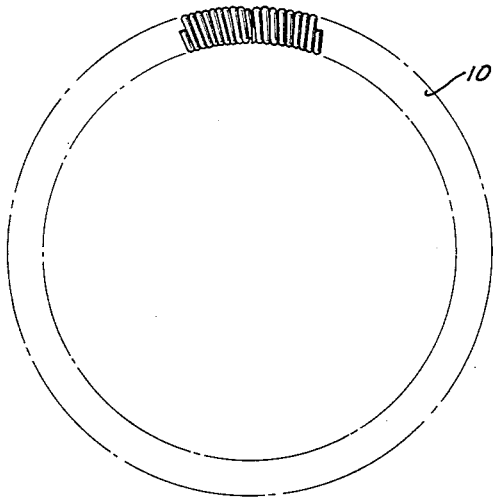
FIGURE 1 is a side view, in elevation, of a coil spring as known to the prior art coupled together in a complete circle.
Figure 2:
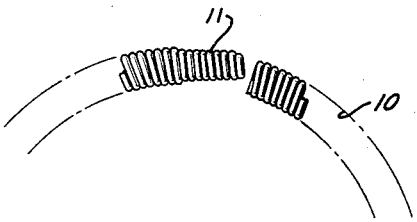
FIGURE 2 is a partial view of the spring of FIGURE 1 showing the ends separated before coupling.
Figure 3:
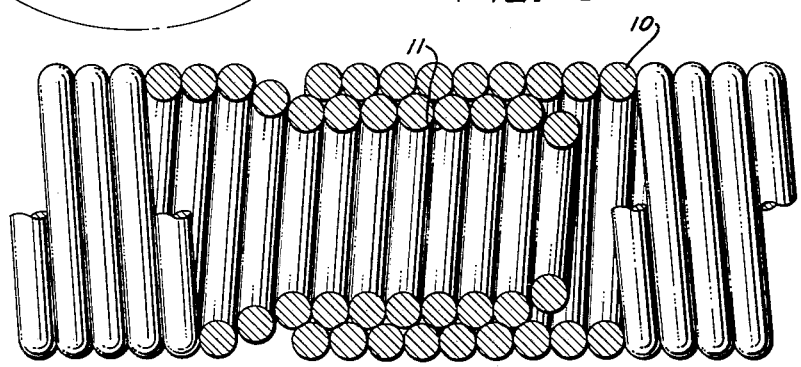
FIGURE 3 is an enlarged view partly in section of the coupling of the ends of the spring of FIGURE 1.
Figure 4:
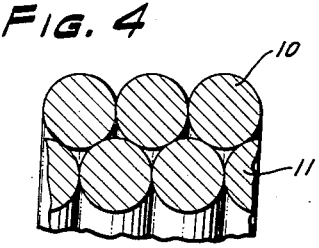
FIGURE 4 is an enlarged partial view of convolutions of one portion of the spring threaded into convolutions of another portion.

Referring now more particularly to FIGURES 1, 2, 3 and 4 of the drawings, these figures show a coil spring 10 formed of a helically wound spring element as shown. At one end of the coil spring the convolutions are of slightly smaller diameter, the spring tapering slightly from the portion of larger diameter to the smaller part, as shown at 11 in FIGURE 2. For coupling this spring into a complete circle to form a flexible belt, the end portion of smaller diameter is threaded into the other end, as shown in FIGURE 3, to form a coupling. This type of spring assembly is known in the prior art and has been used frequently as a flexible belt in power drives and the like. This article, while being useful, does not provide for absolute security in the coupling between the ends of the spring.

Figure 5:
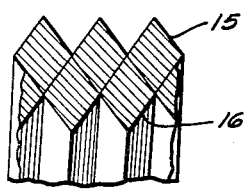
FIGURE 5 is a detail view of convolutions of the improved spring of the herein invention threaded into convolutions of a similar spring wherein the convolutions are diamond-shaped in cross-section.

FIGURE 5 of the drawings shows one of the preferred forms of my invention. This figure, as well as subsequent figures, is a partial view of an assembly wherein one end of a circular spring is threaded into the other end of the same spring or a coupling is provided between two separate springs. One coil spring portion is shown at 15 and as may be seen the cross-section of convolutions is diamond-shaped, the cross-section of the convolutions of the other spring portion also being diamond-shaped, as shown at 16. As will be observed, adjacent convolutions of the inner and outer springs have flat sides which contiguously abut each other. It will be observed that the convolutions of both the inner and outer springs closely approximate or constitute screw-threads. One of the advantages of this type of cross-section is that a very secure coupling is formed between the springs or spring portions, offering very great resistance to axial separation, and the resistance to separation approximating that of actual screw threads.

The structure of FIGURE 5 may, as pointed out, couple separate springs or may couple the ends of a single continuous spring forming a flexible belt. The article of FIGURE 5, either as a continuous belt or as a single length, constitutes a new article which may be utilized as a saw, file or rasp. This article has the characteristic not only of serving the purpose of that tool, but also being flexible at the same time. In the form of a continuous belt the article has the further advantage of providing for a better drive when operating around a toothed drive wheel.

Figure 6:
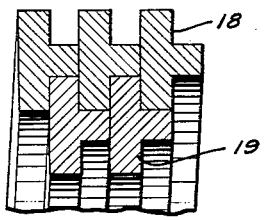
FIGURE 6 is a detail section view of another form of the invention wherein the spring convolutions are T-shaped in cross section.

FIGURE 6 shows a form of the invention wherein the cross-section of the convolutions of the coil spring or springs is T-shaped, as shown at 18 and 19. The particular advantage of this type of cross-section is that the coupling formed offers further increased security by reason of the right-angle engagement of the extending portions of the cross-sections. Flexibility of the joint is nevertheless present in the assembly. The inter-engaged assembly of coil springs of FIGURE 6, as may be seen, is similar to that of inter-engaging square screw threads.

Figure 7:
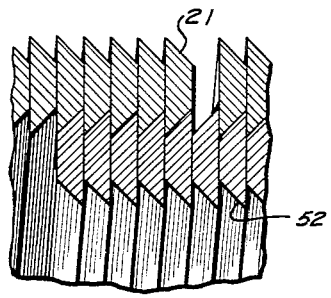
FIGURE 7 is a detail view of convolutions of a spring constituting another form of the invention wherein the convolutions are trapezoidal in cross-section.

Referring to FIGURE 7, in this form of the invention the cross-section of the convolutions of the coil spring is trapezoidal, as shown at 21 and 22. The cross-sectional shapes of the convolutions of the inner and outer springs are the same and they are symmetrical but they are in reversed positions, as respects their geometric centers, as may be seen. That is, the longer sides of the cross-sections of the inner and outer springs are opposite each other, so that adjacent convolutions of the inner and outer springs have slanting abutting surfaces, as shown. The article as shown in FIGURE 7 may serve the purposes as described in connection with FIGURE 5 and provides for positive coupling between two springs or spring portions by reason of the engaging surfaces lying in planes normal to the axis of the assembly.

Figure 8:
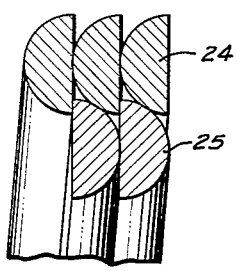
FIGURE 8 is a detail sectional view of another form of the invention wherein the convolutions of the spring are semicircular in cross-section.

FIGURE 8 shows a form of the invention wherein the cross-sections of the convolutions of the coil springs are semicircular, as shown at 24 and 25, and which are oppositely positioned as respects their axes of symmetry, as in FIGURE 7. In this form of the invention adjacent convolutions of the inner and outer springs have both flat abutting portions and curved abutting portions.

Figure 9:
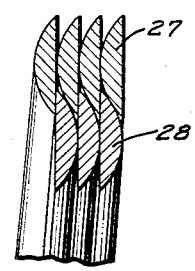
FIGURE 9 is a sectional view of another form of the invention which is similar to that of FIGURE 8 but with the convolutions having a cross-section which has one flat side and one curved side.

In FIGURE 9 a form of the invention is shown which is similar to that of FIGURE 8 wherein the convolutions as shown at 27 and 28 are not semicircular in cross-section but have one flat side and one curved side so that the cross-section forms less than a semicircle. The difference in cross-sectional shape provides for different relative engagement as between adjacent convolutions of the inner and outer springs.

Figure 10:
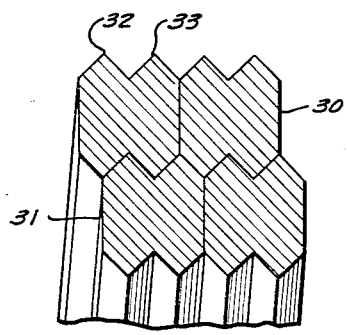
FIGURE 10 is a detail view of another form of the invention wherein the convolutions of the coil spring are of polygonal cross-section, as shown.

Referring to FIGURE 10 of the drawings, this figure shows a form of the invention wherein the convolutions of the springs have a polygonal cross-section, the convolutions having flat sides adjacent each other, as may be seen in the figure at 30 and 31, and each convolution has a pair of helical ribs, as shown at 32 and 33, providing a helical groove or depression between which is V-shaped in cross-section. This form of the invention provides an article having utilities and advantages similar to those described in connection with FIGURE 5. The assembly has extensibility, the extensibility of course taking place between adjacent convolutions but the characteristic being present that the inter-fitting relationship between adjacent convolutions of the inner and outer springs holds them in that adjacent relative position.

All of the forms of the invention shown in FIGS. 6, 7, 8, 9, 10 and 11, may be utilized as a rasp, file or saw. as described in connection with FIG. 5.

Figure 11:
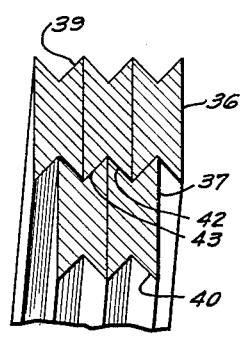
FIGURE 11 is a detail sectional view of another form of the invention wherein the spring convolutions have a cross-section having flat sides abutting each other, the convolutions having inner and outer grooves which are V-shaped in cross-section.

FIG. 11 shows a form of the invention wherein the convolutions of the inner and outer springs, as shown at 36 and 37, each has a continuous helical inner and outer groove, as shown at 39 and 40, these grooves being V-shaped in cross-section. As may be seen, the effect of each of the grooves is to provide two flanges at opposite sides of the groove adjacent the sides of the convolution. The effect, in this form of the invention, when one spring is threaded into the other, is that adjacent flanges of adjacent convolutions of one spring, as indicated at 42 and 43, extend into the helical groove of the adjacent convolution of the other spring. In other words, the groove in the convolution of the other spring holds the two flanges 42 and 43 together so that extensibly is not permitted. Each spring has the same effect on the other as regards extensibility so that in this assembly a firm coupling is formed between the two springs or spring portions which is itself not extensible. In other words, the effect of this particular cross-section in the coupling is to prevent extensibility in the coupling itself.

In a compound spring of this type in which equally long springs (internal and external) are assembled, the result would be to give an extended member of very little extensibility, and limited flexibility (both depending on fitting tolerances) and very considerable axial strength.

Figure 12:
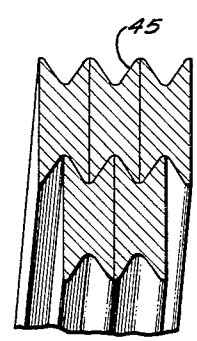
FIGURE 12 is a detail sectional view of another form of the invention similar to that of FIGURE 11 wherein the cross-section of the grooves is of rounded configuration.

FIGURE 12 shows a form of the invention which is similar to that of FIGURE 11 except that the helical grooves and adjacent flanges are of slightly rounded configuration, as shown at 45. The characteristics of this form of the invention are otherwise the same.

Figure 13:
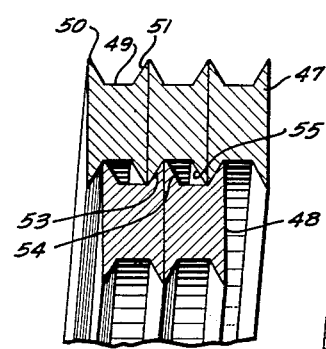
FIGURE 13 is a detail sectional view of another form of the invention similar to that of FIGURE 11 wherein the grooves are of a cross-section having a flat bottom with slanting side walls so as to form flanges at the side of each convolution.

FIGURE 13 shows a form of the invention which is a further adaptation of the characteristics shown in FIGURES 11 and 12. In this form of the invention the convolutions of the inner and outer springs 47 and 48 have inner and outer grooves, as in FIGURES 11 and 12. However, in this form of the invention the grooves have a cross-section which has a flat bottom, as shown at 49, with slanting sides, as shown, so that side flanges are formed, as may be seen at 50 and 51. As may be seen, the axial extent of two adjacent abutting flanges of convolutions of the inner spring, as may be seen at 53 and 54, is of less axial extent than the helical groove in the other spring 47. As a result, the assembly of this form of the invention has an unusual characteristic in that it provides for a limited amount of extensibility of the coupled springs, after which there is no further extensibility; that is, when the flange 54 meets the extending flange 55 of the outer spring 47. The invention of FIGURE 13 may be formed as an article wherein both the outer spring 47 and inner spring 48 form complete belts, one within the other. Such a belt is one having the particular characteristics described; that is, it is a belt which is flexible and which has extensibility which is abruptly limited in the manner described, after which there is no further extensibility, and the belt is extremely strong in an axial direction.

Figure 14:
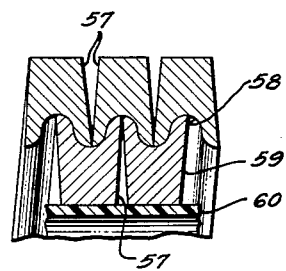
FIGURE 14 is a cross-sectional view of another form of the invention which is similar to that of FIGURE 12, the outer spring, however, being grooved only on the inside and the inner spring being grooved only on the outside, the two springs together being adapted to form a tube.
Figure 14A:
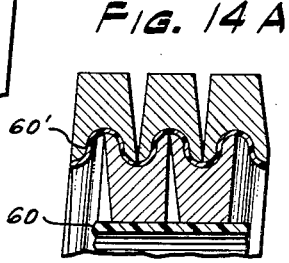
FIGURE 14A is a view similar to FIGURE 14 with an additional sealing medium interposed between interlocked spring convolutions.

FIGURE 14 shows a form of the invention wherein its principles are utilized to provide a useful article in the form of a tube having characteristics not heretofore present in the art. In FIGURE 14, the outer spring has convolutions which have flat adjacent sides tapering slightly outwardly as shown, which are cylindrical on the outside and which have a helical groove on the inside, as shown at 58 in FIGURE 14. The convolutions of the inner spring, as shown at 59, are of similar shape in cross-section, tapering inwardly as shown, but these convolutions have a helical groove on the outside as shown so that the inter-fitting engagement corresponds or is similar to that described in connection with FIGURES 11 and 12. The difference in the assembly of FIGURE 14 is that the assembly forms a cylindrical tube having a cylindrical bore in it. The tube is flexible by reason of the tapered conformation of the sides of the convolutions, as shown at 57, but it is not extensible and is very strong in an axial direction. Numeral 60 designates a layer of plastic sealing film applied inside the bore of the assembly to provide for a sealed structure. The assembly of FIGURE 14 is one wherein the inner and outer springs are of equal length to form a tube as described and if desired a sealing medium may also be used between the adjacent surfaces of the inner and outer springs which are threaded together. Such additional sealing medium is shown at 60' in FIGURE 14A.

Referring to FIGURES 15 and 16 of the drawings, these figures show a part of an endless flexible belt, as described in connection with FIGURES 1 to 4, operating over a toothed wheel, as shown at 65. The wheel 65 is mounted on a shaft 66 supported by supporting members 67 and 68. It will be understood that the articles described in connection with the previous FIGURES 5 to 14 may be formed into an endless belt and operated over a toothed wheel in the manner shown in FIGURES 15 and 16. The advantages flowing from the particular cross-sections described have been pointed out in the foregoing. If desired, the cross-sections as described can be formed from a spring element which is originally circular in cross-section. Also a spring which is itself originally circular in cross-section can be deformed by cold or hot working on a central round rod or mandrel extending through the spring into non-circular shapes. Thus the cross-section of the coil spring can be worked to give shapes as desired for cutting and for appropriate pulley-seating or otherwise. For example, a coil spring having a round cross-section may be deformed to have a cross-sectional shape as shown in FIG. 17. In this figure the spring is one which has been shaped on a mandrel having a helical groove in it conforming to the inner contour of the spring convolutions. As may be seen, spaced convolutions are formed to have a shape which is semi-circular on one side and diamond-shaped on the other. The points of the diamonds are offset angularly from each other as shown in FIGS. 17 and 18 so that they simulate laterally offset teeth of a saw. The convolutions so shaped are designated at 70 and 71. The cross-sectional shape of the material of these individual shaped convolutions is of course different at different points, as may be ascertained from the figures. In this form of the invention the spring is coupled into an endless belt with an undeformed portion of spring as shown in FIG. 18. It may be utilized as a band saw by way of example.

From the foregoing, those skilled in the art will observe that the invention provides improvements in the coupling of the ends of coil springs to each other and it also provides new articles achieved by forming coil springs from members or elements having cross sections other than circular. As explained in the foregoing, coil springs having particular cross-sections as described constitute tools useful for various purposes and provide for devices having characteristics not present in devices heretofore known to the prior art. Flexible belts can be provided having novel characteristics as respects flexibility and degree of extensibility. The invention provides for new articles in the way of tubing having characteristics not heretofore available. Additional novel articles may be achieved utilizing the principles of the invention.

While the instant invention has been shown and described herein in what is conceived to be the most practical and preferred embodiments, it is to be recognized that departures may be made therefrom within the scope of the invention, which is therefore not to be limited to details disclosed herein, but is to be accorded the full scope of the claims.

What is claimed is:

1. As an article of manufacture: means comprising a coil spring formed of a member having a non-circular cross-section; means comprising a coil portion of non-circular cross-section smaller in diameter threaded into said first means; the inter-engaging portions of both the member forming the coil spring and that forming the spring portion each having a circumferential groove having a flange at each side of the groove the flanges of each member extending in screw threaded relationship into a groove in the other member, the inter-fitting engagement thus provided limiting extension of the coil spring and coil spring portion, adjacent flanges on both the coil spring and coil portion being juxtaposed against each other.

2. The article of claim 1 wherein the grooves in the coil spring and spring portion have greater axial extent than abutting flanges fitting into the grooves whereby limited extensibility only of the assembly is permitted.

3. The structure of claim 1 wherein the grooves are of rounded configuration and a sealing medium is disposed between abutting or engaging surfaces of the coil spring and the spring portion and on the inside of the spring portion wherein a tube is formed which is flexible and of high axial strength.

4. As an article of manufacture: means comprising a coil spring formed of a member having a non-circular cross-section; means comprising a coil spring portion of non-circular cross-section smaller in diameter threaded into said first means; the inter-engaging portions of both the member forming the coil spring and that forming the spring portion each being grooved to form a flange at each side of the groove, adjacent flanges of each member extending into a groove in the other member, the inter-fitting engagement thus provided preventing extension of the coil spring and coil spring portion; the said coil spring member having a conformation such that its outer surface is cylindrical and said coil portion having a conformation such that its inner surface is cylindrical whereby the assembled members form a tube which is flexible but not extensible.

5. As an article of manufacture: means comprising a coil spring formed of a member having a non-circular cross-section; means comprising a coil portion of non-circular cross-section smaller in diameter threaded into said first means; the convolutions of both said means having adjacent flat sides substantially in the plane of the convolution, the inter-engaging portions of both the member forming the coil spring and that forming the spring portion each being grooved to form a rib at each side of the groove, and ribs on each of the members extending into a groove in the other member, and the flat sides on each of said means being normally juxtaposed against each other.

6. The article of claim 5 wherein each of the said members have adjacent convolutions having mutually engaging adjacent ribs fully occupying a groove in a convolution of the other member whereby extensibility of the assembly is prevented.

7. The article of claim 5 wherein the coil spring has a smooth cylindrical outer surface and the coil portion has a smooth cylindrical inner surface.

8. The article of claim 5 wherein the said ribs and grooves have a rounded configuration.

9. As an article of manufacture, means comprising a coil spring formed of a member having a non-circular cross section, means comprising a coil portion of non-circular cross section smaller in diameter threaded into said first means, the interengaging portions of both the member forming the coil spring and that forming the spring portion each having a circumferential groove having a flange at each side of the groove, the flanges of each member extending in screw threaded relationship into a groove in the other member, the interfitting engagement thus providing limiting extension of the coil spring and coil spring portion, and convolutions of the coil spring member having an exterior circumferential groove having a flange or rib at each side of the groove.

10. The structure of claim 1 wherein the grooves are of rounded configuration and a sealing medium is disposed on the inside of the spring portion, whereby a tube is formed which is flexible and of high axial strength.

References Cited in the file of this patent

UNITED STATES PATENTS

| | | |
|---|---|---|
| 587,794 | Clench et al | Aug. 10, 1897 |
| 692,960 | Witzenmann | Feb. 11, 1902 |
| 758,066 | Harvey | Apr. 26, 1904 |
| 809,880 | Woolldridge et al. | Jan. 9, 1906 |
| 973,238 | Tideman | Oct. 18, 1910 |
| 1,637,141 | Cooper | July 26, 1927 |
| 2,086,321 | Kudo | July 6, 1937 |
| 2,761,297 | Buchsteiner | Sept. 4, 1956 |

FOREIGN PATENTS

| | | |
|---|---|---|
| 559,788 | France | June 22, 1923 |
| 1,013,447 | France | Apr. 30, 1952 |